US012614263B2

(12) United States Patent
Langevin et al.

(10) Patent No.: US 12,614,263 B2
(45) Date of Patent: Apr. 28, 2026

(54) METHOD OF QUANTIFYING A LOSS OF VISIBILITY THROUGH A TRANSPARENT OBJECT

(71) Applicants: AIRBUS HELICOPTERS DEUTSCHLAND GMBH, Donauworth (DE); AIRBUS HELICOPTERS, Marignane Cedex (FR)

(72) Inventors: Gildas Langevin, Augsburg (DE); Elmar Bonaccurso, Hoehenkirchen (DE); Pierre Fruitet, Pompignan (FR)

(73) Assignees: AIRBUS HELICOPTERS DEUTSCHLAND GMBH, Donauworth (DE); AIRBUS HELICOPTERS, Marignane, Cedex (FR)

( * ) Notice: Subject to any disclaimer, the term of this patent is extended or adjusted under 35 U.S.C. 154(b) by 312 days.

(21) Appl. No.: 17/667,718

(22) Filed: Feb. 9, 2022

(65) Prior Publication Data

US 2022/0405910 A1    Dec. 22, 2022

(30) Foreign Application Priority Data

Jun. 22, 2021    (EP) .................................... 21400014

(51) Int. Cl.
B64C 1/14        (2006.01)
B64D 15/20        (2006.01)
(Continued)

(52) U.S. Cl.
CPC .......... G06T 7/0002 (2013.01); B64C 1/1484 (2013.01); B64D 15/20 (2013.01);
(Continued)

(58) Field of Classification Search
USPC ........................................................ 348/131
See application file for complete search history.

(56) References Cited

U.S. PATENT DOCUMENTS

2014/0354796 A1 * 12/2014 Hein .................... G02B 21/086
                                                                 359/385
2017/0136961 A1    5/2017 Harada et al.
2019/0323920 A1 * 10/2019 Smorgon ........... G01M 11/0235

FOREIGN PATENT DOCUMENTS

CN        109903632      *  6/2019  ............. G01M 9/04
EP            1102962 B1      8/2005
            (Continued)

OTHER PUBLICATIONS

European Search Report for European Application No. EP 21400014. 3, Completed by the European Patent Office, Dated Dec. 9, 2021, 8 pages.

*Primary Examiner* — Mikhail Itskovich
(74) *Attorney, Agent, or Firm* — Brooks Kushman P.C.

(57)        ABSTRACT

A method, comprising: providing a light source, a high contrast providing object, and an image acquisition device; emitting a light beam from the light source through the high contrast providing object, a transparent object and a surface of the transparent object toward the image acquisition device; exposing the surface of the transparent object to icing conditions such that a layer of ice is formed by ice accretion on the surface, wherein the light beam traverses the layer of ice after having traversed the transparent object; acquiring a series of images over time of the high contrast providing object using the image acquisition device; determining blur occurring in the series of images over the time; and quantifying the loss of visibility over the time through the transparent object on the basis of the determined blur.

19 Claims, 4 Drawing Sheets

(51) Int. Cl.
  *G01N 21/59*       (2006.01)
  *G01N 21/958*      (2006.01)
  *G06T 7/00*        (2017.01)
  *H04N 23/56*       (2023.01)

(52) U.S. Cl.
  CPC ........... *G01N 21/59* (2013.01); *G01N 21/958*
          (2013.01); *H04N 23/56* (2023.01); *G01N*
          *2021/9586* (2013.01); *G06T 2207/30168*
                                                (2013.01)

(56)             References Cited

FOREIGN PATENT DOCUMENTS

| JP | 2004237532 | * | 8/2004 | ............ G06Q 10/10 |
|----|------------|---|--------|------------------------|
| KR | 101405120 B1 | | 6/2014 | |
| WO | 9211616 A1 | | 7/1992 | |
| WO | 2018050786 A1 | | 3/2018 | |
| WO | 2018209098 A1 | | 11/2018 | |

* cited by examiner

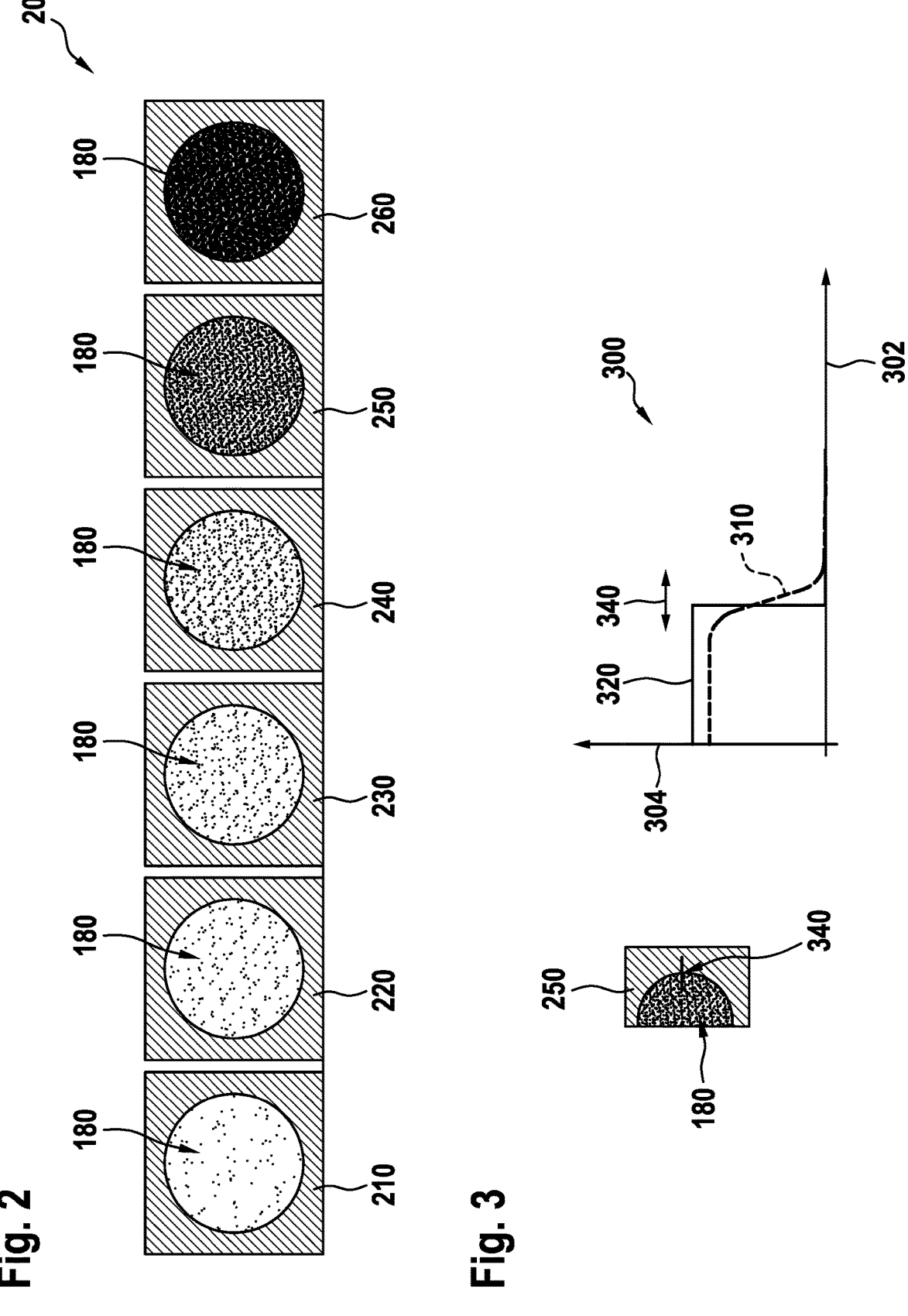

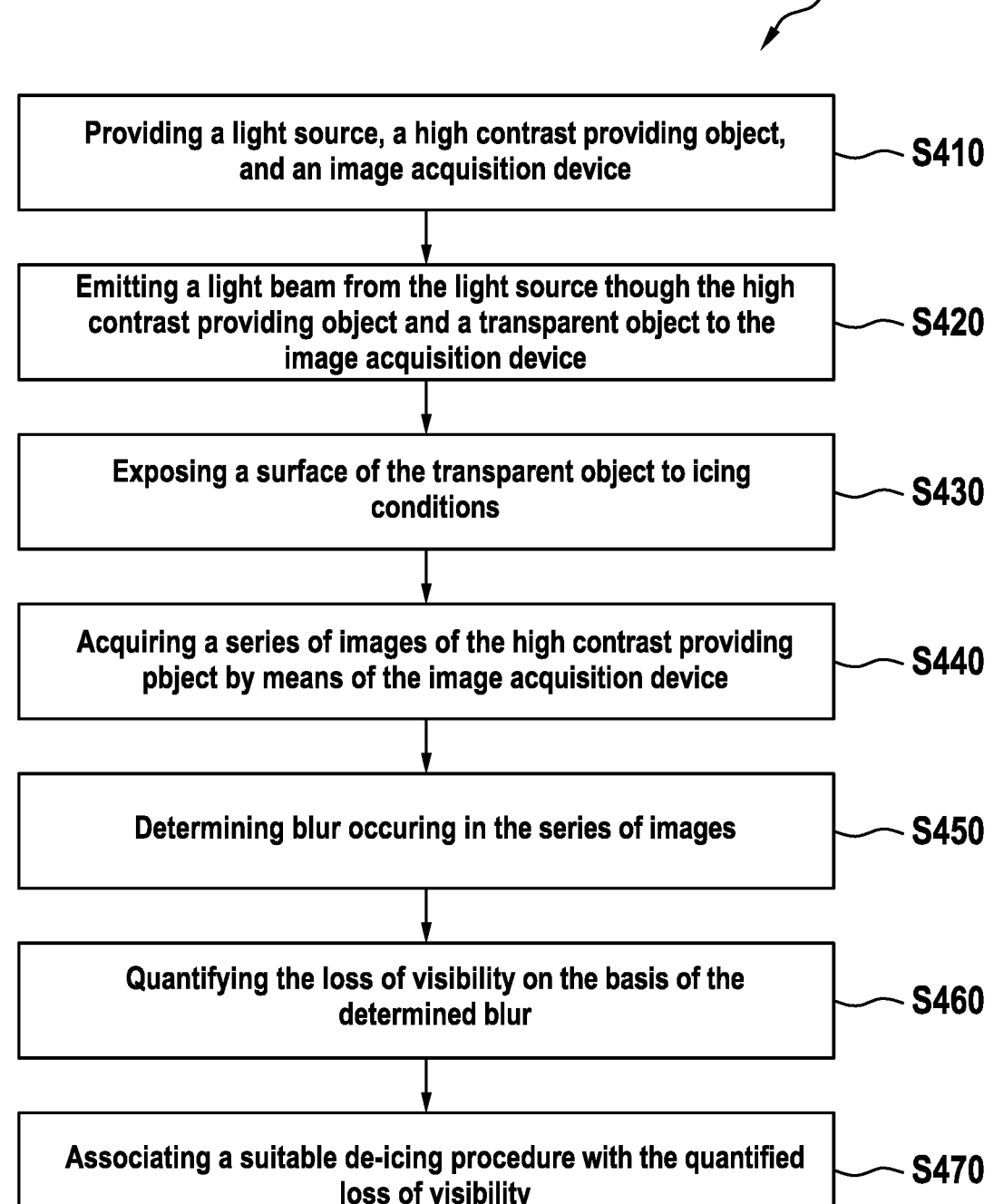

| | |
|---|---|
| Providing a light source, a high contrast providing object, and an image acquisition device | S410 |
| Emitting a light beam from the light source though the high contrast providing object and a transparent object to the image acquisition device | S420 |
| Exposing a surface of the transparent object to icing conditions | S430 |
| Acquiring a series of images of the high contrast providing pbject by means of the image acquisition device | S440 |
| Determining blur occuring in the series of images | S450 |
| Quantifying the loss of visibility on the basis of the determined blur | S460 |
| Associating a suitable de-icing procedure with the quantified loss of visibility | S470 |

METHOD OF QUANTIFYING A LOSS OF VISIBILITY THROUGH A TRANSPARENT OBJECT

CROSS-REFERENCE TO RELATED APPLICATIONS

This application claims priority to European patent application No. EP 21400014.3 filed on Jun. 22, 2021, the disclosure of which is incorporated in its entirety by reference herein.

TECHNICAL FIELD

The disclosure is related to a method of quantifying a loss of visibility through a transparent object caused by icing on a surface of the transparent object. The disclosure is further related to a measurement arrangement that is configured to perform a method of quantifying a loss of visibility through a transparent object caused by icing on a surface of the transparent object.

BACKGROUND

Icing is a well-known phenomenon on vehicles, such as e.g., rotary wing aircrafts and, more particularly, helicopters. More specifically, icing and a resulting ice accretion e.g., on a windshield of a helicopter may lead to a loss of transparency of the windshield and, thus, a loss of visibility leading to a reduced visibility through the windshield for the helicopter's flight crew. Therefore, in order to enable flights of a helicopter under full- or even light-icing conditions, the helicopter's windshield must mandatorily be equipped with an ice protection system with suitable anti- or de-icing capabilities. Such an ice protection system is usually provided by the manufacturer of the helicopter and defined on the basis of predetermined anti- or de-icing performance objectives, as well as corresponding test protocols.

Currently, various different predetermined anti- or de-icing performance objectives are used as a basis to define an ice protection system for a windshield of a helicopter. For instance, a heating power that is required for reaching a specific temperature threshold on the windshield's outer surface under certification-based icing conditions may be used as predetermined anti- or de-icing performance objective. Accordingly, the ice protection system for the windshield may be implemented using a windshield heating device. Other ice protection systems may e.g., be implemented using active vibrating devices or passive, hydrophobic and/or ice-repellent surface treatments, and so on.

By way of example, the document WO 2018/050786 A1 describes an ice protection system with an active vibrating device. The document WO 2018/209098 A1 describes an ice protection system with a passive, hydrophobic surface treatment.

However, the predetermined anti- or de-icing performance objectives underlying a windshield heating device are not suitable for implementation of active vibrating devices or passive, hydrophobic and/or ice-repellent surface treatments. Similarly, the predetermined anti- or de-icing performance objectives underlying active or passive devices, such as active vibrating devices or passive, hydrophobic and/or ice-repellent surface treatments, are not suitable for implementation of windshield heating devices. Similarly, the predetermined anti- or de-icing performance objectives underlying active vibrating devices or passive, hydrophobic and/or ice-repellent surface treatments associated with non-transparent objects, such as e.g., rotor blades, air intakes and so on for helicopter applications, may not merely be transposed to ice protection systems for helicopter windshields.

More specifically, for active vibrating devices or passive, hydrophobic and/or ice-repellent surface treatments used in non-transparent objects the predetermined anti- or de-icing performance objectives may be based on parameters such as a maximum allowed ice adhesion strength and/or a maximum allowed ice accretion specific weight. However, these parameters are not suitable as a basis for the predetermined anti- or de-icing performance objectives in the context of helicopter windshields, where a transparent ice type, such as e.g., glaze ice, may be tolerable even if adhesion is strong and accretion specific weight is significant, while a translucent ice type, such as e.g., rime ice, may result in immediate loss of visibility independently from its adhesion strength or accretion specific weight and should, therefore, not accrete whatsoever.

An alternative parameter that may be used as a basis for the predetermined anti- or de-icing performance objectives of a transparent object such as a helicopter windshield is light transmittance which permits detection of ice accretion on the transparent object by measuring light transmission therethrough.

By way of example, the documents KR 10-1405120 B1 and EP 1 102 962 B1 describe detection of ice accretion by means of measuring light transmission.

However, light transmittance alone does not directly correlate with transparency and cannot characterize an empiric loss of visibility experienced by helicopter pilots. For instance, a translucent ice deposit may only generate a minor light transmittance decrease, but a significant loss of visibility. Conversely, tinted materials typically used for sunshade applications significantly reduce light transmittance while still being translucent.

At this point, it should be noted that also currently existing transparency measurement protocols, such as e.g., ASTM D1003, ISO 13468 haze measurement, and so on, are generally established for intrinsic material transparency measurement, i.e., static and homogeneous, and may, thus, not be used directly to measure dynamic and heterogeneous transparency change over time. Furthermore, they do not reflect heterogeneous loss of visibility generated by ice, as e.g., high-granularity ice deposits generally allow for higher "empirical visibility" than haze values reflect.

As a result, there is currently no measurement protocol that enables characterization of a loss of transparency of a transparent object, i.e., quantification of a loss of visibility through the transparent object, under icing conditions. Thus, it is a complex, laborious and time-consuming task, if possible at all, to compare e.g., existing heating anti- or de-icing technologies in anti- or de-icing systems with upcoming alternative anti- or de-icing technologies, such as the above-described active or passive device technologies.

SUMMARY

It is, therefore, an object of the present disclosure to provide a method of quantifying a loss of visibility through a transparent object caused by icing on a surface of the transparent object, the method being suitable to enable comparison of different anti- or de-icing systems that use differing anti- or de-icing technologies. It is a further object of the present disclosure to provide a measurement arrangement that is configured to perform such a method of quantifying a loss of visibility through a transparent object caused by icing on a surface of the transparent object.

One object of the present disclosure is solved by a method of quantifying a loss of visibility through a transparent object caused by icing on a surface of the transparent object, said method comprising the features of claim 1.

More specifically, according to the present disclosure a method of quantifying a loss of visibility through a transparent object caused by icing on a surface of the transparent object is provided. The method comprises: providing a light source, a high contrast providing object, and an image acquisition device; emitting a light beam from the light source through the high contrast providing object toward the transparent object, the light beam being directed through the transparent object and the surface of the transparent object toward the image acquisition device; exposing the surface of the transparent object to icing conditions such that a layer of ice is formed by ice accretion on the surface, wherein the light beam traverses the layer of ice after having traversed the transparent object; acquiring a series of images over time of the high contrast providing object using the image acquisition device, wherein acquisition of at least two immediately successive images of the series of images is temporally spaced by a predetermined time interval; determining blur occurring in the series of images over the time; and quantifying the loss of visibility over the time through the transparent object on the basis of the determined blur.

Advantageously, this method of quantifying a loss of visibility through a transparent object caused by icing on a surface of the transparent object defines a new test protocol that is usable to characterize a visual impairment generated by ice accretion on a transparent object, such as e.g., a helicopter windshield. This new test protocol may be used for research or serial purposes in the context of new anti- or de-icing performance specifications. In particular, the method according to the present disclosure enables besides others the possibility to open/extend future windshield tenders to innovative anti- or de-icing systems, the performance of which can currently not be assessed.

More particularly, the method of quantifying a loss of visibility through a transparent object caused by icing on a surface of the transparent object advantageously combines a suitable transparent object icing protocol and a picture analysis method. The transparent object icing protocol may be performed in an icing wind tunnel.

Advantageously, the method is adaptable to transparent objects in multiple applications, e.g., in any kind of vehicle, and may be applied to a multitude of different transparent objects, such as e.g., windshields, camera covers, sensor covers, and so on, via a simple parameter adaptation. As a result, determination of a transparency index for a given transparent object type that comprises a predetermined material and that is exposed to a given ice type is enabled as a function over time, i.e., $transparency^{material\_x}_{icetype\_y}$=f (time).

The transparent object icing protocol preferably consists in emitting a light beam from a light source through a high contrast providing object through a transparent object and a surface of the transparent object, on which a layer of ice is formed by ice accretion, toward an image acquisition device, and acquiring a series of images over time of the high contrast providing object using an image acquisition device. A suitable high contrast providing object is e.g., a diaphragm, such that respectively acquired images are pictures taken of the diaphragm. In other words, pictures of the diaphragm are taken at a set time interval, which may be constant or not.

The transparent object may be a sample that is subjected to the icing conditions in the icing wind tunnel, or e.g., a windshield installed on a vehicle, such as a rotary wing aircraft, in particular a helicopter, or a car, etc.

The image acquisition device may be a camera and must be isolated from a respectively created or existing icing atmosphere in order to prevent parasitic ice and/or condensation deposits on its lens, which would affect an achievable quality of the pictures taken and, thus, a respective quality of an overall achievable result. This may be ensured by means of a cover or transparent wind tunnel wall.

An occurring loss of visibility may be quantified by analysing how blur a reference is seen through the transparent object. This reference is preferably the high contrast providing object that may be a backlit diaphragm, or any other object that provides a high contrast in the absence of ice. The reference must also be isolated from the respectively created or existing icing atmosphere in order to avoid parasitic ice accretion, water condensation, etc. which affect the achievable quality of the pictures taken and, thus, the respective quality of the overall achievable result. If a dedicated icing wind tunnel is used, dry bleed air may for instance be blown onto the reference and/or the transparent wind tunnel walls to this end.

Furthermore, ice shall not accrete on a back side of the transparent object which should, in addition, be protected from dust and/or water condensation. Therefore, and in order to avoid wake, recirculation, turbulence, etc., various contraptions may be used, such as e.g., spoilers or flaps, both up- and downstream of the transparent object.

The picture analysis method preferably consists in combining the pictures taken at the set time interval into respective picture batches, and analyzing the respective picture batches to determine an evolution over time of a respective transparency loss, i.e., loss of visibility, in order to derive an associated transparency index. Analyzing the respective picture batches may e.g., be based on a gray level analysis of each picture by means of a function that maps a number of pixels to gray levels in each picture, the function being defined as Gray_level=f(number of pixels), and subsequently analyzing evolution of the respectively determined gray levels. In other words, a haze level for each picture may for instance be correlated with a minimum value of a second derivative of a determined Gray_level=f(number of pixel) curve. Thus, a respective end result that may be obtained could describe a Haze=f(transparent material, icing conditions, time) curve, which can be linked to a pass/fail criterion and, thus, define an anti-icing performance objective for research or specification purposes, and/or a live Haze measurement that could be associated with a close-loop "automatic anti-icing" mode on an anti-iced transparency.

Advantageously, the picture analysis method may be extended to heterogeneous optical effects that cannot be quantified by currently existing transparency measurement protocols, e.g., the so-called "orange-peel" effect, the unidirectional polishing-induced halo effect, and so on. Furthermore, instead of using the picture analysis method only with a transparent object icing protocol that is performed in a dedicated icing wind tunnel, the picture analysis method may likewise be used as base principle for a vehicle onboard ice detection and/or protection system, for windshields or other subsystems exposed to icing.

According to some aspects, determining the blur comprises determining an individual haze level for each acquired image of the series of images, wherein quantifying the loss of visibility over the time through the transparent object on the basis of the determined blur comprises quantifying the loss of visibility over the time through the transparent object on the basis of the determined individual haze levels.

According to some aspects, determining an individual haze level for each acquired image of the series of images comprises correlating each determined individual haze level with a minimum value of a second derivative of a function that maps a number of pixels to gray levels in an associated acquired image, the function being defined as Gray_level=f (number of pixels).

According to some aspects, quantifying the loss of visibility over the time through the transparent object on the basis of the determined individual haze levels comprises plotting the determined individual haze levels into a diagram using a function that associates each determined individual haze level at least with a time stamp, icing conditions at a point of time indicated by the time stamp, and an associated material of the transparent object, wherein each time stamp represents an acquisition time of an associated acquired image, and wherein the function is defined as Haze_level=f (transparent object material, icing conditions, time stamp).

According to some aspects, plotting the determined individual haze levels into a diagram comprises deriving an overall transparency index for the transparent object from the diagram.

According to some aspects, the method further comprises associating a suitable de-icing procedure for the surface of the transparent object with the quantified loss of visibility.

According to some aspects, the transparent object is arranged inside an icing wind tunnel, wherein exposing the surface of the transparent object to icing conditions comprises isolating the high contrast providing object and the image acquisition device from the icing conditions to avoid at least parasitic ice accretion, water condensation and/or dust deposition on the high contrast providing object and the image acquisition device.

According to some aspects, isolating the high contrast providing object and the image acquisition device from the icing conditions comprises covering the high contrast providing object and the image acquisition device by means of associated covers at least between acquisition of immediately successive images of the series of images.

According to some aspects, isolating the high contrast providing object and the image acquisition device from the icing conditions comprises blowing dry bleed air onto the high contrast providing object and/or the image acquisition device.

According to some aspects, blowing dry bleed air onto the high contrast providing object and/or the image acquisition device comprises at least blowing the dry bleed air along associated tunnel walls of the icing wind tunnel in the region of the high contrast providing object and/or the image acquisition device.

According to some aspects, exposing the surface of the transparent object to icing conditions comprises isolating an opposed surface of the transparent object from the icing conditions to avoid at least parasitic ice accretion, water condensation and/or dust deposition on the opposed surface.

According to some aspects, the image acquisition device comprises a camera.

According to some aspects, the high contrast providing object comprises a backlit diaphragm.

According to some aspects, the transparent object is a vehicle windshield or a sample of a vehicle windshield, in particular an aircraft windshield or a sample of an aircraft windshield.

Advantageously, the vehicle windshield may be the windshield of a wide range of vehicles including, but not being limited to, helicopters, aircrafts, cars, and vessels. Preferably, the vehicle is a rotary wing aircraft and, more particularly, a helicopter.

The other object of the present disclosure is solved by a measurement arrangement that is configured to perform a method of quantifying a loss of visibility through a transparent object caused by icing on a surface of the transparent object as described above.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

FIG. 2 shows a series of images acquired by means of the measurement arrangement of FIG. 1, FIG. 3 shows a diagram of a gray level function derived from the series of images of FIG. 2, FIG. 4 shows a flow diagram of a method of quantifying a loss of visibility through a transparent object caused by icing on a surface of the transparent object according to the present disclosure.

DETAILED DESCRIPTION

Figure 1:
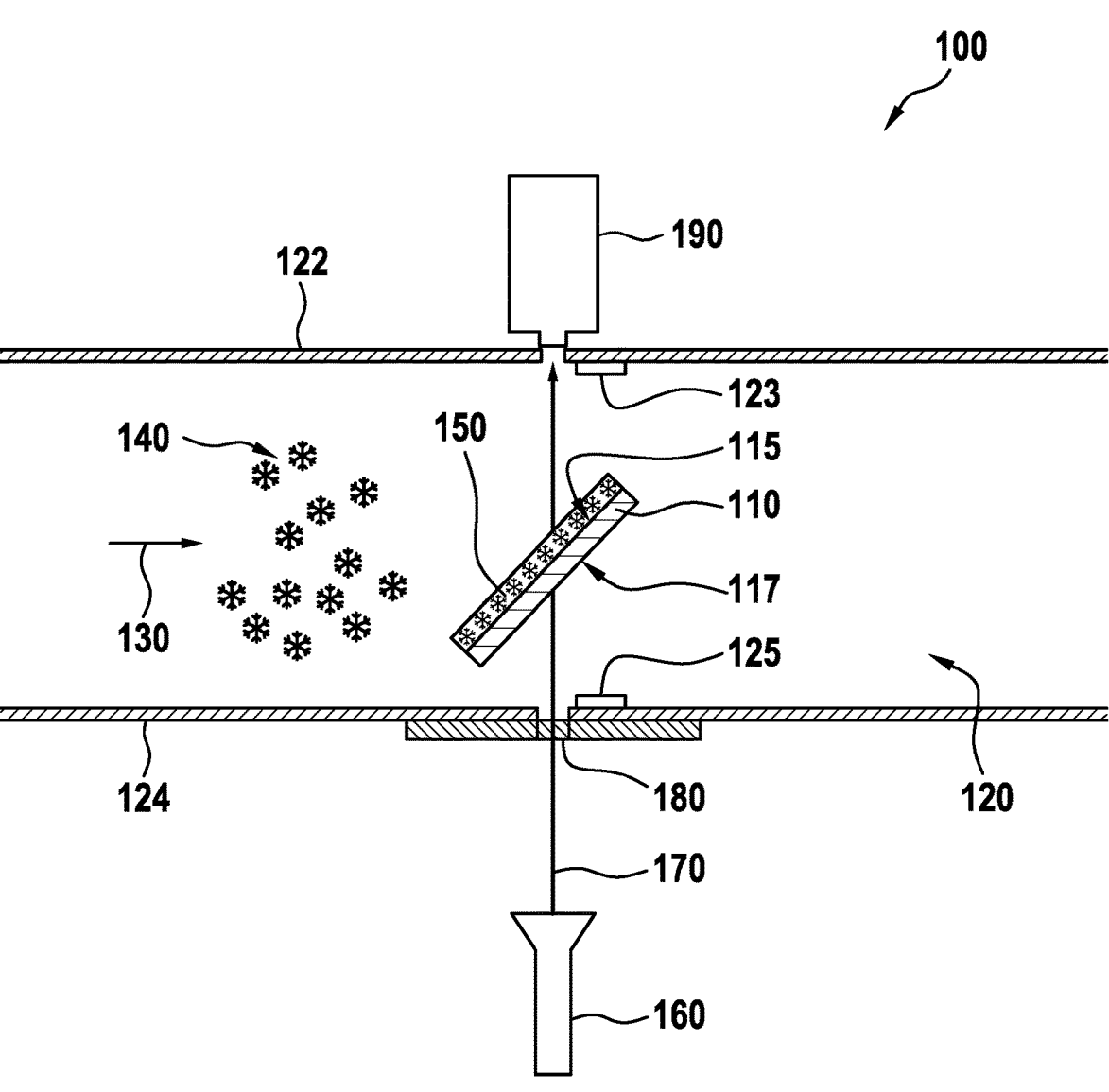
FIG. 1 shows a schematic view of a measurement arrangement that is configured to perform a method of quantifying a loss of visibility through a transparent object caused by icing on a surface of the transparent object according to the present disclosure.

FIG. 1 shows an illustrative measurement arrangement 100 with a light source 160, a high contrast providing object 180, and an image acquisition device 190 according to the present disclosure. Illustratively, the measurement arrangement 100 is embodied such that the high contrast providing object 180 is positioned between the light source 160 and the image acquisition device 190, and that a transparent object 110 with a surface 115 may be positioned between the high contrast providing object 180 and the image acquisition device 190 such that the surface 115 of the transparent object 110 is oriented toward the image acquisition device 190. Thus, the light source 160 may emit a light beam 170 through the high contrast providing object 180 toward the transparent object 110 such that the light beam 170 is directed through the transparent object 110 and the surface 115 of the transparent object 110 toward the image acquisition device 190.

According to one aspect of the present disclosure, the measurement arrangement 100 is configured to perform a method of quantifying a loss of visibility through the transparent object 110 caused by icing on the surface 115 of the transparent object 110. Preferably, the surface 115 of the transparent object 110 is subjected to icing conditions such that a layer of ice 150 is formed by ice accretion on the surface 115.

By way of example, the measurement arrangement 100 is mounted to an icing wind tunnel 120 which enables creation of suitable icing conditions. Illustratively, the icing wind tunnel 120 is formed with opposed, preferably diametrically opposed, wind tunnel walls 122, 124, wherein the high contrast providing object 180 and the light source 160 are arranged behind the wind tunnel wall 124, and wherein the image acquisition device 190 is arranged behind the wind tunnel wall 122.

In other words, the light source 160, the high contrast providing object 180 and the image acquisition device 190 are preferably arranged outside of the icing wind tunnel 120. However, in order to enable traversal of the light beam 170 emitted from the light source 160 through the high contrast providing object 180 toward the image acquisition device 190, the wind tunnel walls 124, 122 may be transparent in the region of the light source 160, the high contrast providing object 180 and the image acquisition device 190. Alternatively, or in addition, suitable covers 123, 125 may be provided at the wind tunnel walls 122, 124, which may either be transparent or movable so as to be opened as required to enable traversal of the light beam 170 emitted from the light source 160 through the high contrast providing object 180 toward the image acquisition device 190.

In contrast to the light source 160, the high contrast providing object 180 and the image acquisition device 190, the transparent object 110 is illustratively arranged inside of the icing wind tunnel 120. By way of example, any suitable mounting element may be used to mount the transparent object 110 in the icing wind tunnel 120 between the wind tunnel walls 122, 124 such that the light beam 170 emitted from the light source 160 through the high contrast providing object 180 is directed through the transparent object 110 and the surface 115 of the transparent object 110 toward the image acquisition device 190.

For instance, the transparent object 110 is a vehicle windshield or a sample of a vehicle windshield, in particular an aircraft windshield or a sample of an aircraft windshield. The high contrast providing object 180 may e.g., comprise a backlit diaphragm or any other object that provides a high contrast in the absence of ice. The image acquisition device 190 may e.g., comprise a camera.

In an illustrative operation of the measurement arrangement 100 for quantifying a loss of visibility through the transparent object 110 caused by icing on the surface 115 of the transparent object 110, the transparent object 110 is subjected to icing conditions such that the layer of ice 150 is formed by ice accretion on the surface 115. The icing conditions are preferably obtained by means of an icing wind flow 130 that is directed in the icing wind tunnel 120 toward the surface 115 of the transparent object 110 and that creates an icing atmosphere 140 on the surface 115 of the transparent object 110 to cause a desired ice accretion on the surface 115 such that the layer of ice 150 is formed. Accordingly, the light beam 170 emitted from the light source 160 through the high contrast providing object 180 and the transparent object 110 as well as the surface 115 of the transparent object 110 toward the image acquisition device 190 traverses the layer of ice 150 after having traversed the transparent object 110 and prior to reaching the image acquisition device 190. Thus, the image acquisition device 190 may acquire a series of images over time of the high contrast providing object 180, as described below at FIG. 2, and blur occurring in the series of images over the time due to the layer of ice 150 may be determined for quantifying the loss of visibility over the time through the transparent object 110.

However, in order to guarantee obtention of accurate results in operation of the measurement arrangement 100, the high contrast providing object 180, as well as the light source 160 and the image acquisition device 190 are preferably isolated from the icing conditions to avoid at least parasitic ice accretion, water condensation and/or dust deposition on the high contrast providing object 180 and/or the image acquisition device 190. This may be achieved by means of the covers 123, 125 on the wind tunnel walls 122, 124, which may e.g., cover the image acquisition device 190 and the high contrast providing object 180 at least between acquisition of immediately successive images taken by the image acquisition device 190, or by embodying at least partly transparent wind tunnel walls 122, 124, as described above. Furthermore, dry bleed air may be blown onto the high contrast providing object 180 and/or the image acquisition device 190, and/or along the wind tunnel walls 124, 122 in the region of the high contrast providing object 180 and/or the image acquisition device 190.

Moreover, still in order to guarantee obtention of accurate results in operation of the measurement arrangement 100, a surface 117 of the transparent object 110 that is opposed to the surface 115 is preferably isolated from the icing conditions to avoid at least parasitic ice accretion, water condensation and/or dust deposition on the opposed surface 117. This may e.g., be achieved by means of various contraptions, such as e.g., spoilers or flaps, both up- and downstream of the transparent object 110, which may be used to avoid wake, recirculation, turbulence, etc. on the transparent object. However, suitable contraptions are well-known to the person skilled in the art and, therefore, not illustrated in detail in FIG. 1.

FIG. 2 shows an illustrative series of images 200 acquired by means of the image acquisition device 190 in operation of the measurement arrangement 100 of FIG. 100. By way of example, the series of images 200 comprises six separate images 210, 220, 230, 240, 250, 260 of the high contrast providing object 180 of FIG. 1.

According to one aspect of the present disclosure, the six separate images 210, 220, 230, 240, 250, 260 are taken over time at a set time interval, which may be constant or not. In other words, acquisition of at least two immediately successive images of the series of images 200, e.g., the images 210, 220, is temporally spaced by a predetermined time interval.

Illustratively, blur occurring in the series of images 200 increases. More specifically, the blur increases with a respectively increasing ice accretion level on the surface 115 of the transparent object 110 of FIG. 1. Thus, by determining the increase of the blur over the time, a respective loss of visibility through the transparent object 110 of FIG. 1 may be quantified, as described in detail below at FIG. 4.

FIG. 3 shows an illustrative gray level function diagram 300 with an abscissa 302, onto which a number of pixels is mapped, and an ordinate 304, onto which a gray level as function of the number of pixels is mapped. By way of example, the gray level function diagram 300 is associated with the image 250 of the high contrast providing object 180 according to FIG. 2 and, more particularly, with a transition zone 340 that corresponds to an outer edge of the high contrast providing object 180 in the image 250.

More specifically, the gray level function diagram 300 illustrates a measured gray level function 310 and a theoretical gray level function 320. The theoretical gray level function 320 illustrates a comparative gray level function associated with the transition zone 340 in non-icing conditions, i.e., without blur and, consequently, with optimal contrast and without haze. Accordingly, the left-hand portion of the illustrated transition zone 340, i.e., illustratively the inner portion of the high contrast providing object 180, has a desired white part of gray value 255, while the right-hand portion of the illustrated transition zone 340, i.e., illustratively the portion outside of the high contrast providing object 180, has a black part of gray value 0. Thus, the theoretical gray level function 320 has a rectangular form with a sharp edge.

In contrast thereto, the measured gray level function 310 illustrates actually present gray levels associated with the transition zone 340 in icing conditions, i.e., with blur due to haze and, consequently, reduced contrast. Accordingly, the gray level of the left-hand portion of the illustrated transition zone 340, i.e., illustratively the inner portion of the high contrast providing object 180, is reduced compared to the theoretical gray level function 320, and transition to the gray level of the right-hand portion of the illustrated transition zone 340, i.e., illustratively the portion outside of the high contrast providing object 180, is stretched. Thus, instead of having a rectangular form with a sharp edge, the measured gray level function 310 has the form of a rounded rectangle with a ramp-shaped transition.

As a result, a comparison of the measured gray level function 310 with the theoretical gray level function 320 enables determination of an actual transparency reduction and, thus, an actual transparency loss of the transparent object 110 of FIG. 1 under icing conditions on the basis of the image 250. Thus, by determining respective measured gray level functions for each one of the images 210, 220, 230, 240, 250, 260 of FIG. 2 and by comparing each one of these respective measured gray level functions with the theoretical gray level function 320, an evolution over time of an associated transparency loss, i.e., loss of visibility, of the transparent object 110 of FIG. 1 under icing conditions may be determined in order to derive an overall transparency index.

Preferably, a gray level analysis of each one of the images 210, 220, 230, 240, 250, 260 of FIG. 2 is performed by means of a function that maps a number of pixels to gray levels in each image, the function being defined as Gray_level=f(number of pixels), and subsequently evolution of the respectively determined gray levels is analyzed. Thus, a haze level for each one of the images 210, 220, 230, 240, 250, 260 of FIG. 2 may for instance be correlated with a minimum value of a second derivative of a determined Gray_level=f(number of pixel) curve. Thus, a respective end result may be obtained that describes a Haze=f(transparent material, icing conditions, time) curve, which can be linked to a pass/fail criterion and, thus, define an anti-icing performance objective for research or specification purposes, and/or a live Haze measurement that could be associated with a close-loop "automatic anti-icing" mode on an anti-iced transparency.

FIG. 4 shows an illustrative method 400 of quantifying a loss of visibility through a transparent object (e.g., transparent object 110 of FIG. 1) caused by icing on a surface (e.g., surface 115 of FIG. 1) of the transparent object according to the present disclosure. Preferably, the method 400 starts with providing, in step S410, a light source (e.g., light source 160 of FIG. 1), a high contrast providing object (e.g., high contrast providing object 180 of FIG. 1), and an image acquisition device (e.g., image acquisition device 190 of FIG. 1). At step S420, a light beam (e.g., light beam 170 in FIG. 1) is emitted from the light source through the high contrast providing object toward the transparent object, the light beam being directed through the transparent object and the surface of the transparent object toward the image acquisition device. At step S430, the surface of the transparent object is exposed to icing conditions such that a layer of ice (e.g., layer of ice 150 in FIG. 1) is formed by ice accretion on the surface, wherein the light beam traverses the layer of ice after having traversed the transparent object.

At step S440, a series of images (e.g., series of images 200 in FIG. 2) is acquired over time of the high contrast providing object using the image acquisition device, wherein acquisition of at least two immediately successive images (e.g., images 210, 220 in FIG. 2) of the series of images is temporally spaced by a predetermined time interval. At step S450, blur occurring in the series of images over the time is determined, and at step S460, the loss of visibility over the time through the transparent object on the basis of the determined blur is quantified.

In an optional step S470, a suitable de-icing procedure for the surface of the transparent object is associated with the quantified loss of visibility. Thus, if a quantified loss of visibility exceeds e.g., a predetermined threshold, de-icing of the transparent object may be initiated, as described in more detail below at FIG. 5.

According to one aspect, determining the blur at step S450 comprises determining an individual haze level for each acquired image (e.g., each one of the images 210, 220, 230, 240, 250, 260 of FIG. 2) of the series of images. More specifically, determining an individual haze level for each acquired image of the series of images may comprise correlating each determined individual haze level with a minimum value of a second derivative of a function (e.g., measured gray level function 310 of FIG. 3) that maps a number of pixels to gray levels in an associated acquired image, the function being defined as Gray_level=f(number of pixels).

Thus, quantifying the loss of visibility over the time through the transparent object on the basis of the determined blur at step S460 may comprise quantifying the loss of visibility over the time through the transparent object on the basis of the determined individual haze levels. More specifically, quantifying the loss of visibility over the time through the transparent object on the basis of the determined individual haze levels may comprise plotting the determined individual haze levels into a diagram using a function that associates each determined individual haze level at least with a time stamp, icing conditions at a point of time indicated by the time stamp, and an associated material of the transparent object. Each time stamp preferably represents an acquisition time of an associated acquired image. The function is preferably defined as Haze_level=f(transparent object material, icing conditions, time stamp). Plotting the determined individual haze levels into a diagram may comprise deriving an overall transparency index for the transparent object from the diagram.

According to one aspect, exposing the surface of the transparent object at step S430 to icing conditions comprises isolating the high contrast providing object and the image acquisition device from the icing conditions. Thus, at least parasitic ice accretion, water condensation and/or dust deposition on the high contrast providing object and the image acquisition device may be avoided.

Isolating the high contrast providing object and the image acquisition device from the icing conditions may comprise covering the high contrast providing object and the image acquisition device by means of associated covers (e.g., covers 123, 125 of FIG. 1) at least between acquisition of immediately successive images (e.g., images 210, 220 of FIG. 2) of the series of images. In addition, or alternatively, isolating the high contrast providing object and the image acquisition device from the icing conditions may comprise blowing dry bleed air onto the high contrast providing object and/or the image acquisition device. By way of example, blowing dry bleed air onto the high contrast providing object and/or the image acquisition device may comprise at least blowing the dry bleed air along associated tunnel walls (e.g., wind tunnel walls 122, 124 of FIG. 1) of a respective icing wind tunnel (e.g., icing wind tunnel 120 of FIG. 1) in the region of the high contrast providing object and/or the image acquisition device.

In addition, or alternatively, exposing the surface of the transparent object at step S430 to icing conditions may comprise isolating an opposed surface (e.g., opposed surface 117 in FIG. 1) of the transparent object from the icing conditions to avoid at least parasitic ice accretion, water condensation and/or dust deposition on the opposed surface. This may e.g., be achieved by means of various contraptions, such as e.g., spoilers or flaps, both up- and downstream of the transparent object, which may be used to avoid wake, recirculation, turbulence, etc. on the transparent object.

Figure 5:
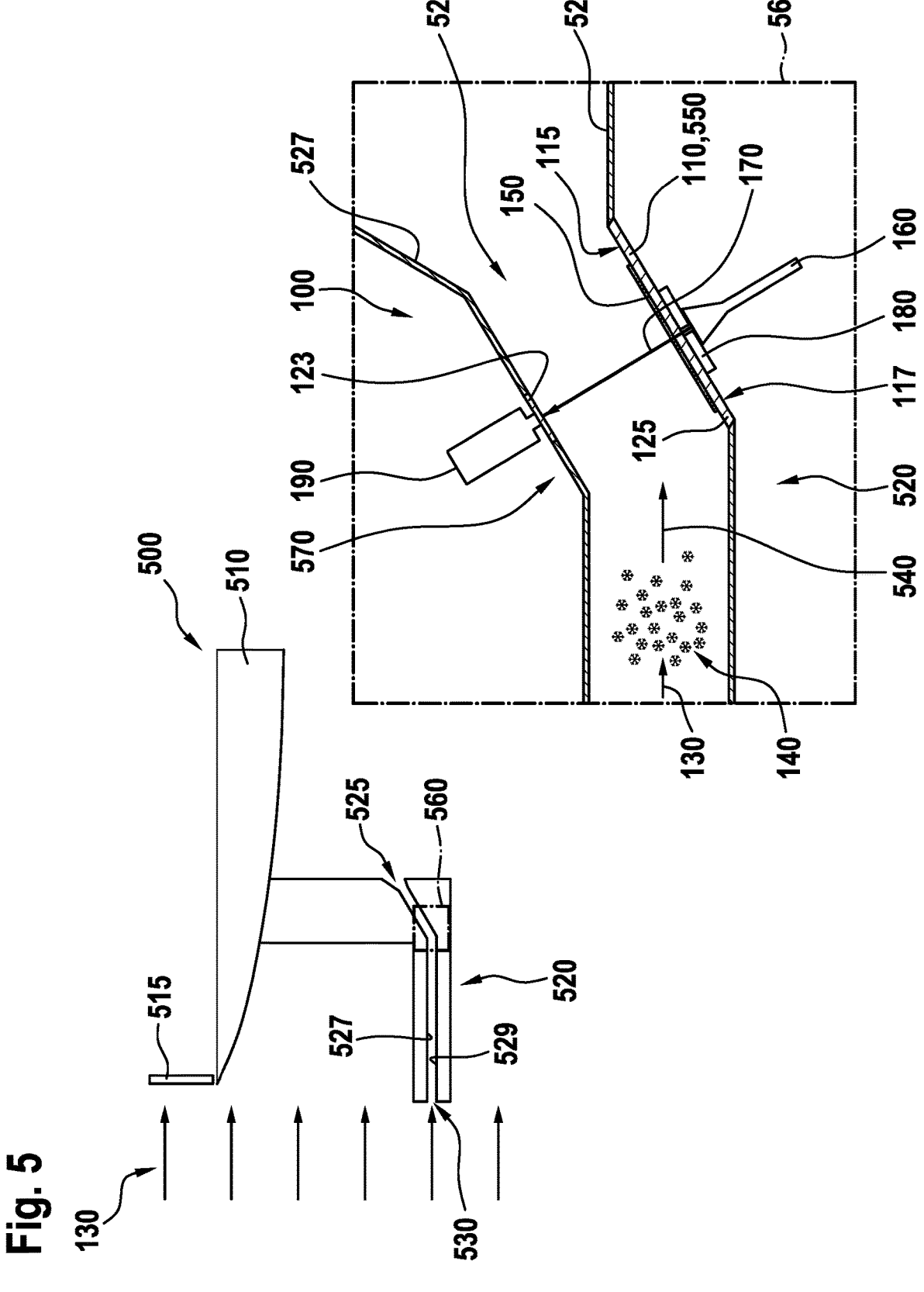
FIG. 5 shows a schematic view of a vehicle that comprises the measurement arrangement of FIG. 1.

FIG. 5 shows an illustrative vehicle 500 that is equipped with the measurement arrangement 100 of FIG. 1. For simplicity and clarity of the drawing, the vehicle 500 is only schematically illustrated in sections by means of a vehicle frame 510 which supports a windshield 515. The windshield 515 is preferably embodied by means of a transparent, light-permeable material.

The vehicle 500 may be any vehicle that may be equipped with the windshield 515, such as a spacecraft or an aircraft, e.g., a spaceship, an airplane, a rotary wing aircraft, in particular a helicopter, etc., a land-operated vehicle, e.g., a car, a bus, a truck, a train, etc., or even a watercraft, e.g., a ship, a boat, or a hovercraft, etc. The windshield 515 illustratively represents the transparent object 100 of FIG. 1, which may be subjected to icing conditions, e.g., due to the icing wind flow 130 of FIG. 1. In the illustrated example, the icing wing flow 130 may be the result of a movement of the vehicle 500 in a direction that is opposed to the direction of the icing wind flow 130.

According to one aspect of the present disclosure, the vehicle frame 510 is provided with a measurement device 520. Preferably, the measurement device 520 is of the Pitot-type, i.e., it is formed similar to a Pitot tube or probe with an air flow channel 525 having associated air flow channel walls 527, 529 and an inlet opening 530 that points directly into the icing wind flow 130. Illustratively, the measurement device 520 is provided with the measurement arrangement 100 of FIG. 1 in a possibly simplified and miniaturized configuration, as illustrated in a magnified detail view 560 of the measurement device 520.

More specifically, the magnified detail view 560 shows a kinked section 570 of the air flow channel 525, to which the measurement arrangement 100 of FIG. 1 with the high contrast providing object 180, the light source 160, and the image acquisition device 190, as well as the transparent object 110 with the surfaces 115, 117 and the covers 123, 125, is mounted, and wherein the air flow channel 525 implements the icing wind tunnel 120 of FIG. 1. Illustratively, the image acquisition device 190 is mounted behind the cover 123 to the air flow channel wall 527, i.e., outside of the air flow channel 525. By way of example, the cover 123 is implemented by means of a transparent portion of the air flow channel wall 527. Furthermore, a sample 550 of the windshield 515, i.e., a sample made from the same material as the windshield 515, is illustratively mounted to the opposed air flow channel wall 529. The sample 550 implements the transparent object 110 with the surfaces 115, 117, as well as the cover 125. Illustratively, the high contrast providing object 180 and the light source 160 are mounted behind the sample 550 and, more particularly, behind the surface 117 of the sample 550, i.e., outside of the air flow channel 525.

In an illustrative operation of the vehicle 500 and, thus, the measurement device 520, the icing wind flow 130 enters the air flow channel 525 via the inlet opening 530 and creates an icing atmosphere 140 that is blown in a flow direction 540 toward the surface 115 of the sample 550, where it causes ice accretion on the surface 115 of the sample 550 such that the layer of ice 150 is formed on the surface 115. Accordingly, the light beam 170 emitted from the light source 160 through the high contrast providing object 180 and the sample 550 as well as the surface 115 of the sample 550 toward the image acquisition device 190 traverses the layer of ice 150 after having traversed the sample 550 and prior to reaching the image acquisition device 190. Thus, the image acquisition device 190 may acquire a series of images over time of the high contrast providing object 180 (e.g., the series of images 200 of FIG. 2) and blur occurring in the series of images over the time due to the layer of ice 150 may be determined for quantifying the loss of visibility over the time through the sample 550.

According to one aspect of the present disclosure, the quantified loss of visibility over the time through the sample 550 is representative for a respective loss of visibility over the time through the windshield 515. Thus, in the vehicle 500 a suitable de-icing procedure for de-icing the windshield 515 may be activated e.g., if the respective loss of visibility exceeds a predetermined threshold.

For instance, if the vehicle 500 is an aircraft, such as e.g., a rotary wing aircraft and, more particularly, a helicopter, an associated flight control system of the aircraft may implement together with the measurement device 520 an ice protection system of the helicopter. The ice protection system may be adapted to control acquisition of the series of images over time of the high contrast providing object 180, and to determine blur occurring in the series of images over the time as well as to quantify the loss of visibility over the time through the sample 550 on the basis of the determined blur, preferably in accordance with the method steps S440, S450, and S460 as described above at FIG. 4. In addition, the ice protection system may be adapted to activate a suitable de-icing procedure for de-icing the windshield 515 as required, e.g., if the loss of visibility through the sample 550 and, thus, the windshield 515 exceeds a predetermined threshold, preferably in accordance with the method step S470 as described above at FIG. 4.

REFERENCE LIST 100 measurement arrangement
110 transparent object
115 object surface
117 opposed object surface
120 icing wind tunnel
122, 124 icing wind tunnel walls
123, 125 covers
130 icing wind flow
140 icing atmosphere
150 layer of ice
160 light source
170 light beam
180 high contrast providing object
190 image acquisition device
200 series of images
210, 220, 230, 240, 250, 260 individual images

300 gray level function diagram
302 number of pixels abscissa
304 gray level ordinate
310 measured gray level function with blur
320 theoretical gray level function without blur
340 transition zone of high contrast providing object
400 method of quantifying loss of visibility
500 vehicle
510 vehicle frame
515 vehicle windshield
520 measurement device
525 air flow channel
527, 529 air flow channel walls
530 airflow channel inlet opening
540 flow direction
550 sample of a vehicle windshield
560 magnified detail view
570 kinked section
S410-S470 Method steps

What is claimed is:

1. A method of quantifying a loss of visibility through a transparent object caused by icing on a surface of the transparent object, comprising:

providing a light source, a high contrast providing object, and an image acquisition device with the high contrast providing object being positioned between the light source and the transparent object and with the transparent object being positioned between the high contrast providing object and the image acquisition device;

emitting a light beam from the light source through the high contrast providing object toward the transparent object, the light beam being directed through the transparent object and the surface of the transparent object toward the image acquisition device;

exposing the surface of the transparent object to icing conditions such that a layer of ice is formed by ice accretion on the surface of the transparent object, wherein exposing the surface of the transparent object to icing conditions comprises isolating the light source, the high contrast providing object, the image acquisition device, and an opposed surface of the transparent object from the icing conditions, wherein the light beam traverses the layer of ice after having traversed the transparent object;

acquiring a series of images over time of the high contrast providing object taken through the transparent object using the image acquisition device while the light beam is being emitted, wherein acquisition of at least two immediately successive images of the series of images is temporally spaced by a predetermined time interval;

determining blur occurring in the series of images over the time; and quantifying the loss of visibility over the time through the transparent object based on the determined blur.

2. The method of claim 1, wherein determining the blur comprises determining an individual haze level for each acquired image of the series of images, and wherein quantifying the loss of visibility over the time through the transparent object on the basis of the determined blur comprises quantifying the loss of visibility over the time through the transparent object on the basis of the determined individual haze levels.

3. The method of claim 2, wherein determining an individual haze level for each acquired image f the of series images comprises correlating each determined individual haze level with a minimum value of a second derivative of a function that maps a number of pixels to gray levels in an associated acquired image, the function being defined as Gray level=f(number of pixels).

4. The method of claim 2, wherein quantifying the loss of visibility over the time through the transparent object on the basis of the determined individual haze levels comprises plotting the determined individual haze levels into a diagram using a function that associates each determined individual haze level at least with a time stamp, icing conditions at a point of time indicated by the time stamp, and an associated material of the transparent object, wherein each time stamp represents an acquisition time of an associated acquired image, and wherein the function is defined as Haze_level=f (transparent object material, icing conditions, time stamp).

5. The method of claim 4, wherein plotting the determined individual haze levels into a diagram comprises deriving an overall transparency index for the transparent object from the diagram.

6. The method of claim 1, further comprising:
associating a suitable de-icing procedure for the surface of the transparent object with the quantified loss of visibility.

7. The method of claim 1, wherein the transparent object is arranged inside an icing wind tunnel.

8. The method of claim 7, wherein isolating the high contrast providing object and the image acquisition device from the icing conditions comprises covering the high contrast providing object and the image acquisition device by associated covers at least between acquisition of immediately successive images of the series of images.

9. The method of claim 7, wherein isolating the high contrast providing object and the image acquisition device from the icing conditions comprises blowing dry bleed air onto the high contrast providing object and/or the image acquisition device.

10. The method of claim 9, wherein blowing dry bleed air onto the high contrast providing object and/or the image acquisition device comprises at least blowing the dry bleed air along associated tunnel walls of the icing wind tunnel in the region of the high contrast providing object and/or the image acquisition device.

11. The method of claim 1, wherein the image acquisition device comprises a camera.

12. The method of claim 1 wherein the high contrast providing object comprises a backlit diaphragm.

13. The method of claim 1, wherein the transparent object is a vehicle windshield, a sample of a vehicle windshield, an aircraft windshield, or a sample of an aircraft windshield.

14. A measurement arrangement for quantifying a loss of visibility through a transparent object caused by icing on a surface of the transparent object, wherein the surface of the transparent object is exposed to icing conditions such that a layer of ice is formed by ice accretion on the surface of the transparent object, the measurement arrangement comprising:

a light source;
an image acquisition device; and
a high contrast providing object, the high contrast providing object being positioned between the light source and the image acquisition device;
the high contrast providing object and the image acquisition device being positioned such that the transparent object is positioned between the high contrast providing object and the image acquisition device with the surface of the transparent object being oriented toward the image acquisition device, wherein the light source, the image acquisition device, the high contrast providing object, and an opposed surface of the transparent object oriented toward the high contrast providing object are isolated from the icing conditions;

wherein the light source is configured to emit a light beam through the high contrast providing object toward the transparent object, the light beam being directed through the transparent object and the surface of the transparent object toward the image acquisition device and traversing the layer of ice after having traversed the transparent object;

the image acquisition device is configured to acquire a series of images over time of the high contrast providing object taken through the transparent object while the light beam is being emitted, acquisition of at least two immediately successive images of the series of images being temporally spaced by a predetermined time interval; and a loss of visibility over the time through the transparent object is quantifiable based on blur occurring in the series of images over the time.

15. The method of claim 1, wherein the surface of the transparent object is oriented toward the image acquisition device.

16. The measurement arrangement of claim 14, wherein the transparent object is a vehicle windshield, a sample of a vehicle windshield, an aircraft windshield, or a sample of an aircraft windshield.

17. The measurement arrangement of claim 14, wherein the image acquisition device comprises a camera and the high contrast providing object comprises a backlit diaphragm.

18. A measurement system for quantifying a loss of visibility through a windshield caused by icing on a surface of the windshield, wherein the surface of the windshield is exposed to an icing wind flow such that a layer of ice is formed by ice accretion on the surface of the windshield, the measurement system comprising:

a tube having an air flow channel with an inlet opening that is pointed directly into the icing wind flow, the tube having a kinked section;

a measurement arrangement positioned at the kinked section of the tube, the measurement arrangement including a transparent object, a light source, a high contrast providing object, and an image acquisition device, the transparent object being a sample of the windshield and is of a same material as the windshield, the transparent object being positioned within the air flow channel with a surface of the transparent object being exposed to the icing wind flow that enters the air flow channel via the inlet opening such that a layer of ice is formed by ice accretion on the surface of the transparent object and with an opposed surface of the transparent object being isolated from the icing wind flow;

the high contrast providing object being positioned between the light source and the transparent object, and the high contrast providing object and the image acquisition device being positioned such that the transparent object is positioned between the high contrast providing object and the image acquisition device with the surface of the transparent object being oriented toward the image acquisition device, and the transparent object, the light source, and the image acquisition device being isolated from the icing wind flow;

wherein the light source is configured to emit a light beam through the high contrast providing object toward the transparent object, the light beam being directed through the transparent object and the surface of the transparent object toward the image acquisition device and traversing the layer of ice formed on the surface of the transparent object after having traversed the transparent object;

the image acquisition device is configured to acquire a series of images over time of the high contrast providing object taken through the transparent object while the light beam is being emitted, acquisition of at least two immediately successive images of the series of images being temporally spaced by a predetermined time interval; and a loss of visibility over the time through the transparent object is quantifiable based on blur occurring in the series of images over the time.

19. The measurement system of claim 18, wherein the image acquisition device comprises a camera and the high contrast providing object comprises a backlit diaphragm.

* * * * *